United States Patent [19]
Iida

[11] Patent Number: 5,546,219
[45] Date of Patent: Aug. 13, 1996

[54] OPTICAL CIRCUIT AND LIGHT TRANSMISSION SYSTEM AND METHOD USING THE SAME

[75] Inventor: Masanori Iida, Neyagawa, Japan

[73] Assignee: Matsushita Electric Industrial Co., Ltd., Osaka, Japan

[21] Appl. No.: 397,961

[22] Filed: Mar. 3, 1995

[30]     Foreign Application Priority Data

Mar. 3, 1994 [JP] Japan .................... 6-033913

[51] Int. Cl.$^6$ ............................................. G02F 1/09
[52] U.S. Cl. .................. 359/281; 359/256; 359/263; 359/484; 359/495
[58] Field of Search ............................ 359/281, 280, 359/283, 256, 263, 484, 494, 495; 385/8, 11

[56]     References Cited

U.S. PATENT DOCUMENTS

| | | | |
|---|---|---|---|
| 4,548,478 | 10/1985 | Shirasaki | 359/256 |
| 5,204,771 | 4/1993 | Koga | 359/281 |
| 5,237,445 | 8/1993 | Kuzuta | 359/281 |
| 5,272,433 | 12/1993 | Simonelli | 359/281 |
| 5,315,431 | 5/1994 | Masuda et al. | 359/281 |
| 5,408,354 | 4/1995 | Hosokawa | 359/281 |

*Primary Examiner*—Loha Ben
*Attorney, Agent, or Firm*—Ratner & Prestia

[57]     ABSTRACT

In the forward direction, the light from an input fiber is polarized and separated in a polarized light separating and combining element, the separated polarized light is rotated by a polarized light rotating element, dispersed according to wavelength by a wavelength dispersing element, rotated again by the polarized light rotating element, and is further rotated by a phase plate, thereby combining the polarized lights in the polarized light separating and combining element, so that only the light of a desired wavelength is coupled with the optical fiber. In the reverse direction, the light from the output fiber is not coupled with the input fiber, and hence the light propagation direction is defined in one direction in the disclosed optical circuit. A light transmission system and method using this optical circuit is also presented.

20 Claims, 16 Drawing Sheets

OPTICAL CIRCUIT AND LIGHT TRANSMISSION SYSTEM AND METHOD USING THE SAME

BACKGROUND OF THE INVENTION

1. Field of the Invention

The present invention relates to an optical circuit used in two-way optical CATV or optical data transmission and a light transmission system using the same.

2. Related Art of the Invention

In the light transmission system and method, recently, as the information is sophisticated and diversified, transmission of larger capacity is demanded, and request type transmission is being realized, which gives rise to necessity of two-way exchange of video information, data, etc. Where multiple branching and distributing should be required as in optical CATV, it is necessary to compensate for branching loss by disposing optical amplifiers before and after branching. In the case of analog signal transmission, in order to eliminate the effects of return light, it is necessary to insert a optical isolator in at least one of the front and rear optical amplifiers.

Some examples of conventional light transmission system are described by referring to FIG. 23 to FIG. 25. Same reference numerals in the diagrams refer to identical members.

First, in FIG. 23, reference numeral 30 is a light source, 31 is a light receiver, 23 is a optical amplifier, 27 is a band pass filter passing only a signal light emitted from the light source 30, and 28 is a optical isolator for passing the light only in an arrow direction and blocking the return light advancing in reverse direction. Herein, the signal light emitted from the light source 30 is amplified by the optical amplifier 23, and the spectrum of the amplified light contains asynchronous spontaneous emission (ASE) light components possessed by the optical amplifier 23, and these components distribute in a wide wavelength region outside the wavelength region of the signal light. The band pass filter 27 removes the undesired ASE light components, which is beneficial for low noise transmission.

In FIG. 24, next, reference numerals 30a and 30b are light sources for sending light in wavelength $\lambda_1$ and $\lambda_2$, and 31a and 31b are light receivers for receiving the light in wavelength $\lambda_1$ and $\lambda_2$, and the light source 30a and light receiver 31a, and the light source 30b and light receiver 31b respectively form pairs. Reference numerals 21a, 21b, 21c, 21d, 21e, 21f are optical multi/demodulators for combining or separating light, 22a and 22b are optical isolators, and 23 is a optical amplifier.

The light in wavelength $\lambda_1$ is emitted from the light source 30a, and is led into the optical multi/demodulator 21f through the optical multi/demodulator 21d and optical multi/demodulator 21c. On the other hand, the light in wavelength $\lambda_2$ is emitted from the light source 30b and is led into the optical multi/demodulator 21f through the optical multi/demodulator 21a and optical multi/demodulator 21b and is combined with the light in wavelength $\lambda_1$. The light multiplexed in wavelength in this way is amplified in batch in the optical amplifier 23 through the optical isolator 22b, and then separated in wavelength into light in wavelength $\lambda_1$ and light in $\lambda_2$ by the optical multi/demodulator 21e through the optical isolator 22a. The light in wavelength $\lambda_1$ is led into the light receiver 31a through the optical multi/demodulator 21b and optical multi/demodulator 21a. On the other hand, the light in wavelength $\lambda_2$ is led into the light receiver 31b through the optical multi/demodulator 21c and optical multi/demodulator 21d. By such operation, two-way transmission by light in wavelength $\lambda_1$ and $\lambda_2$ is realized.

FIG. 25 differs from FIG. 24 in that it is constituted to perform optical amplification in every wavelength to be multiplexed. That is, the light in wavelength $\lambda_1$ is amplified by the optical amplifier 33a through the optical isolator 32c from the optical multi/demodulator 21c, and is fed into the optical multi/demodulator 21b through the optical isolator 32a, whereas the light in wavelength $\lambda_2$ is amplified in the optical amplifier 33b through the optical isolator 32b from the optical multi/demodulator 21b, and is fed into the optical multi/demodulator 21c through the optical isolator 32d.

In such constitution, however, the devices of single functions such as band pass filter and optical multi/demodulator are composed so that the return light, if generated, passes through directly, and it is always required to assemble with optical isolators, and the number of parts increases in the system, and it takes time and labor in assembling.

SUMMARY OF THE INVENTION

It is hence a primary object of the invention to present an optical circuit and a light transmission system and method simple in constitution and assembly, by reducing the number of parts, in the light of the problems of the conventional optical circuit.

To achieve the object, the invention presents an optical circuit comprising:

- a plurality of light input and output units for receiving or emitting light,
- a polarized light separating and combining element for separating an incident light from at least one light input and output unit A of the plurality of light input and output units into two polarized lights, and for being capable of combining two polarized lights to emit into at least one light input and output unit B other than the light input and output unit A,
- polarized light rotating means for rotating the separated two polarized lights at specific different angles depending on a light running direction, and
- wavelength dispersing element for dispersing wavelength of polarized light in order to obtain light of specific wavelength, wherein
- the specific angle rotated by the polarized light rotating means is such an angle as to emit the light to the light input and output unit B as for the light incoming from the light input and output unit A, and not to emit the light to the light input and output unit A as for the light incoming from the light input and output unit B.

The invention also presents a light transmission system and method comprising a light transmitter for sending out light, at least one optical amplifier for amplifying the sent light, the optical circuit for passing the amplified light, and a light receiver for receiving the passed light.

Accordingly, the light transmitter sends out light, the optical amplifier amplifies the sent light, the optical circuit passes the amplified light, and the light receiver receives the passed light.

The invention moreover presents a light transmission system comprising plural light transmitting and receiving units for transmitting and receiving light, an optical circuit group having a plurality of the optical circuits for passing the light transmitted between the light transmitting and receiving units, and at least one optical amplifier for amplifying the light passing through the optical circuit group.

DESCRIPTION OF THE PREFERRED EMBODIMENTS

Figure 1:
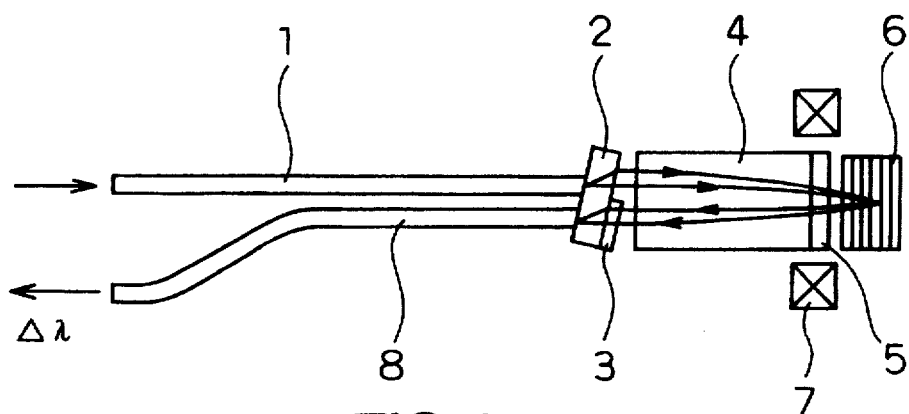
FIG. 1 is a structural diagram of an optical circuit in a first embodiment of the invention.

FIG. 1 is a structural diagram of an optical circuit in a first embodiment of the invention. In FIG. 1, reference numerals 1 and 8 are input and output fibers as light input and output units, 2 is a birefringent crystal which is a polarized light separating and combining element, 3 is a half-wavelength plate as a second polarized light rotating unit composed of a phase element, 4 is a lens, 5 is a Faraday rotator which is a first polarized light rotating unit, 6 is a diffraction grating as a wavelength dispersing element, and 7 is a magnet. The half-wavelength plate 3 and Faraday rotator 5 compose polarized light rotating means.

Figure 2A:
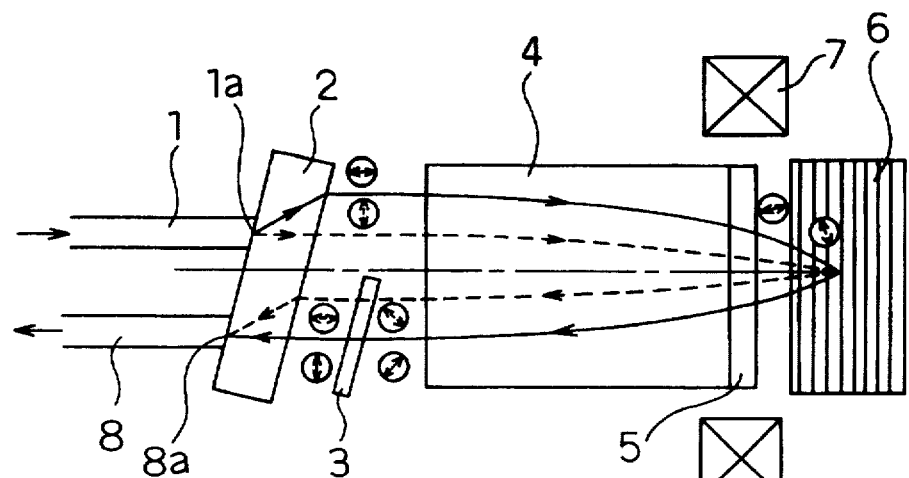
FIG. 2(a) and 2(b) are diagrams showing the modes of light propagation and polarization in the first embodiment.
Figure 2B:
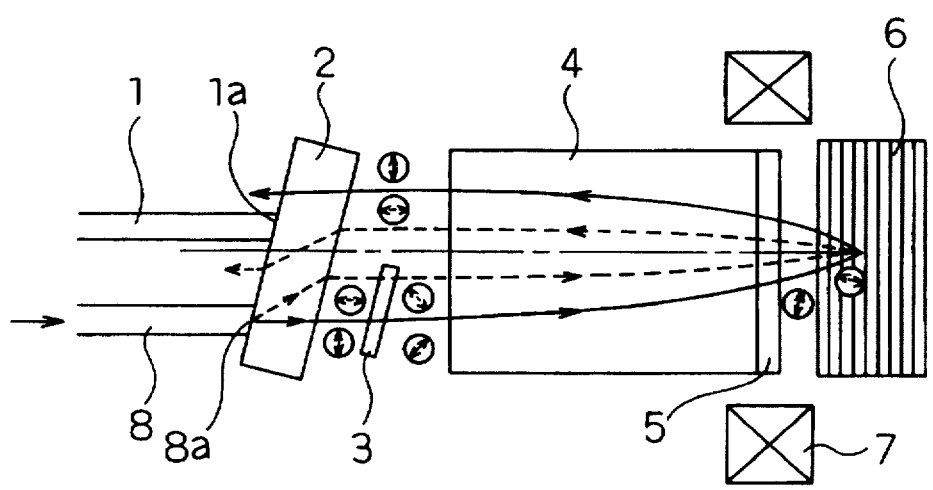

FIG. 2(a) and FIG. 2(b) are diagrams showing the mode of polarization in propagation used for explaining the operation of the embodiment, FIG. 2(a) is a diagram showing the operating state in the case of so-called forward direction, that is, the light is entered from the input and output fiber 1 side, and FIG. 2(b) is a diagram showing the operating state in the so-called reverse direction, that is, the light is entered from the input and output fiber 8 side. The both arrows in a circle in the diagram indicate the direction of polarization in each part as seen always from the right side on the drawing, and the polarized light of ordinary light component for the input light is indicated by broken in FIG. 2(a) and solid line in FIG. 2(b), and the extraordinary light component in solid line in FIG. 2(a) and broken line in FIG. 2(b).

Figure 3:
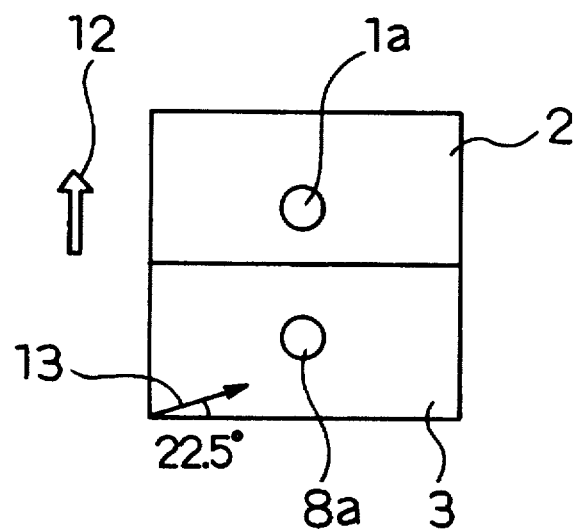
FIG. 3 is a diagram showing the configuration of birefringent crystal and half-wavelength plate in the first embodiment.

FIG. 3 is a diagram showing the inclination of the polarized light separating direction by the birefringent crystal 2 and the optical axis direction of the half-wavelength plate 3, showing the configuration as seen from the right side facing the sheet of paper of FIG. 1. Reference numeral 12 is the polarized light separating direction of the birefringent crystal 2, 13 is the optical axis direction of the half-wavelength plate, 1a shows the position of the input and output fiber 1, and 8a denotes the position of the input and output fiber 8.

The polarized light separating direction 12 of the birefringent crystal 2 is set parallel to the grating groove direction of the diffraction grating 6, and the Faraday rotator 5 is set to rotate 22.5 degrees counterclockwise always about the direction of polarization by the magnetic field applied by the magnet 7. The optical axis direction 13 of the half-wavelength plate 3 is disposed, as shown in FIG. 3, at an inclination of 22.5 degrees in the counterclockwise direction to the vertical line of the polarized light separating direction 12 on the plane of the half-wavelength plate 3.

The operation of the embodiment, first in forward direction propagation of the optical circuit, is explained below by reference to FIG. 2(a) and FIG. 3.

The incident light from the input and output fiber 1 is separated into mutually orthogonal polarized components by the birefringent crystal 2. The light of the component polarized in the separated vertical direction (indicated by broken line in FIG. 2(a) and FIG. 2(b), hereinafter called ordinary light component) and the light polarized in the lateral direction (indicated by solid line in FIG. 2(a) and FIG. 2(b), hereinafter called extraordinary light component) are different in the route of propagation in the birefringent crystal 2, and the position is deviated at the exit end of the birefringent crystal 2. This phenomenon is reversible. The lights of ordinary light component and extraordinary light component enter the Faraday rotator 5 through the lens 4, and each polarized light rotates 22.5 degrees counterclockwise, and enters the diffraction grating 6. In the diffraction grating 6, the incident light is dispersed in wavelength onto the planes vertical to the grating groove direction and grating plane. After wavelength dispersion, the light enters again the Faraday rotator 5, and each polarized light rotates 22.5 degrees counterclockwise, and gets into the half-wavelength plate 3 through the lens 4. In the half-wavelength plate 3 disposed as shown in FIG. 3, the polarized light rotates 45 degrees counterclockwise, and hence each polarized light rotates 90 degrees counterclockwise from the initial state. It means that the ordinary light component becomes extraordinary light component, and that extraordinary light component becomes ordinary light component. As a result, the light components entering the birefringent crystal 2 propagate so that polarized lights may be combined, and the combined light is emitted into the input and output fiber 8. At this time, of the light dispersed in wavelength, the light in the wavelength region coupling with the input and output fiber position 8a is guided into the input and output fiber 8, thereby selecting the wavelength.

The operation in reverse direction propagation is explained next by referring to FIG. 2(b). The light entering from the input and output fiber 8 side is polarized and separated into the ordinary light component indicated by solid line and extraordinary light component indicated by broken line by the birefringent crystal 2, and gets into the half-wavelength plate 3. In the half-wavelength plate 3, both ordinary light component and extraordinary light component are changed in the polarizing direction by 45 degrees clockwise this time. The polarized light passing through the half-wavelength 3 is rotated 22.5 degrees counterclockwise by the Faraday rotator 5 through the lens 4, and then dispersed in wavelength by the diffraction grating 6 and is rotated 22.5 degrees counterclockwise again by the Faraday rotator 5. As a result, each light component is not changed in the polarizing direction, but ordinary light component of polarized lights returns to ordinary light component, and extraordinary light component, to extraordinary light component, thereby entering the birefringent crystal 2 through the lens 4. Therefore, this time, each polarized light further propagates in the separating direction, never coupling with the input and output fiber 1. Herein, since the polarized light separating direction of the birefringent crystal 2 and the wavelength dispersing direction by the diffraction grating 6 are orthogonal to each other, if there is light of other wavelength region dispersed in wavelength, the polarized light component will not escape to leak into the input and output fiber 1.

Thus, in the embodiment, an optical circuit having both filter function for selecting the wavelength and optical isolation function can be composed in a simple constitution.

In the embodiment, meanwhile, the polarized light rotating direction of the Faraday rotator 5 is set counterclockwise, but when it is set in FIG. 1 so that the polarized light of is rotated 22.5 degrees clockwise by the Faraday rotator 5, while other constitution is the same, the light from the input and output fiber 8 is selected in wavelength and is coupled with the input and output fiber 1, while the light from the input and output fiber 1 is not coupled with the input and output fiber 8, so that the direction of isolation is inverted.

Figure 4:
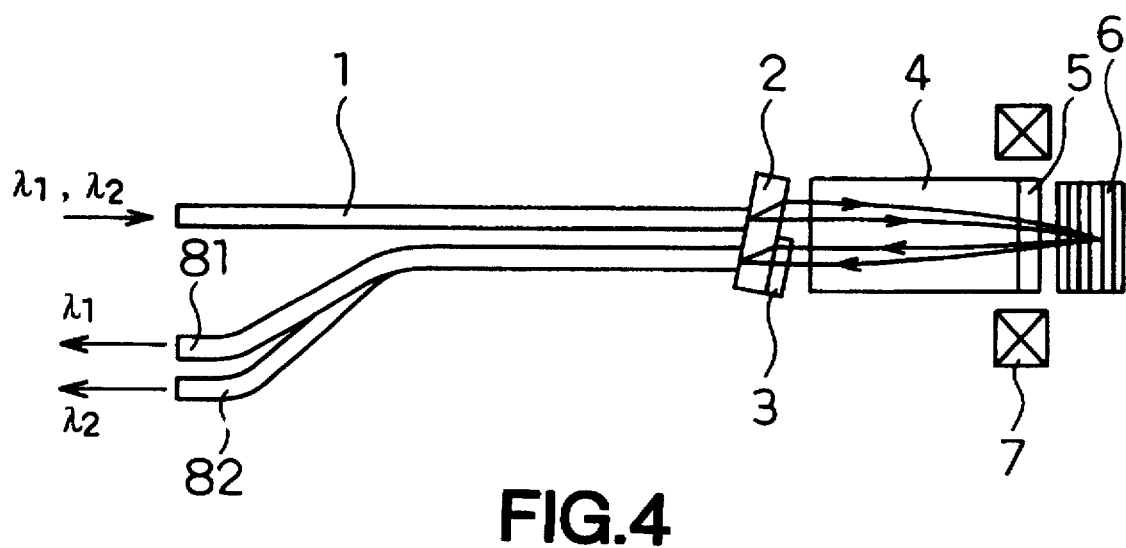
FIG. 4 is a structural diagram of an optical circuit in a second embodiment.

FIG. 4 is a structural diagram of an optical circuit in a second embodiment. What differs from the first embodiment in FIG. 1 is that plural input and output fibers 81, 82 are disposed, instead of the input and output fiber 8, so that the light may pass through the half-wavelength plate 3, and the others are the same. The input and output fibers 81, 82 are disposed parallel to the wavelength dispersing direction of the diffraction grating 6, that is, in the depth direction to the sheet of paper of the drawing, and are hence overlapped on the drawing.

Figure 5:
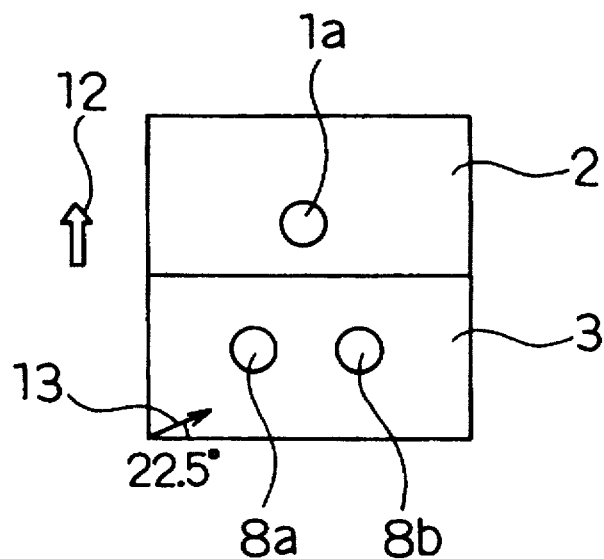
FIG. 5 is a diagram showing the configuration of birefringent crystal and half-wavelength plate in the second embodiment.
Figure 6A:
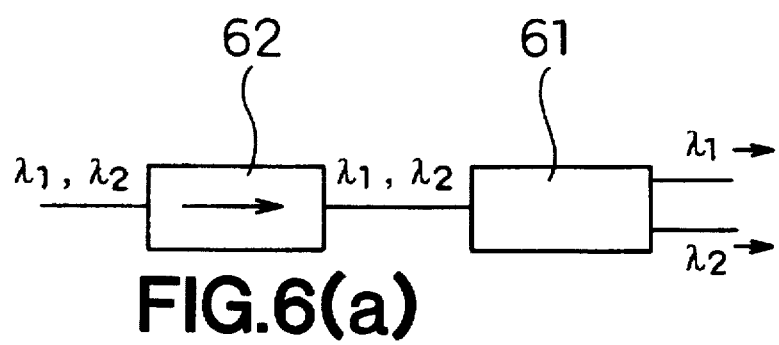
FIG. 6(a) and 6(b) are diagrams for explaining the function of the second embodiment.
Figure 6B:
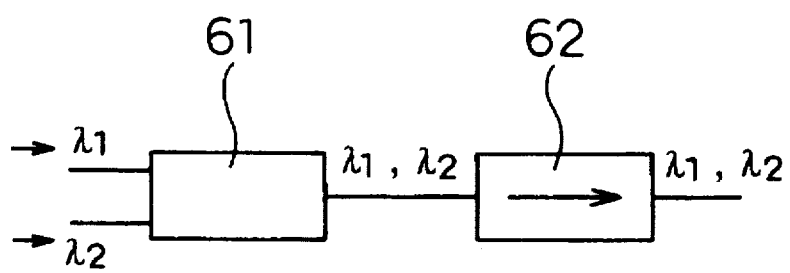

FIG. 5 shows the inclination of polarized light separating direction 12 by the birefringent crystal 2 and optical axis direction 13 of half-wavelength plate 3, and is a configuration as seen from the right side facing the sheet of paper of FIG. 4, and reference numerals 8a, 8b are positions of the input and output fibers 81, 82, respectively. FIG. 6(a) and FIG. 6(b) shows an example of composing the functions of the embodiment by individual components. Reference numeral 61 is a optical multi/demodulator, and 62 is an optical isolator.

The operation of the optical circuit of the second embodiment is described below.

First, in the forward direction, the light multiplexed in wavelength of wavelength $\lambda_1$, $\lambda_2$ is entered from the input and output fiber 1, and is polarized and separated by the birefringent crystal 2. Each polarized light component is rotated 22.5 degrees counterclockwise by the Faraday rotator 5 through the lens 4, and wavelengths $\lambda_1$, $\lambda_2$ are dispersed in each polarized light by the diffraction grating 6. The wavelength dispersed light is rotated again by the Faraday rotator 5 and the polarized light is rotated counterclockwise to rotate 45 degrees in total, and the polarized light is further rotated 45 degrees counterclockwise by the half-wavelength plate 3, thereby entering the birefringent crystal 2. The polarized light propagates so as to be polarized and synthesized in the crystal of the birefringent crystal 2, and lights of wavelength $\lambda_1$, $\lambda_2$ are coupled with the input and output fiber positions 8a, 8b shown in FIG. 5, so as to be separated in wavelength.

In the reverse direction, operating same as in the first embodiment, the lights from the input and output fibers 81, 82 are not coupled with the input and output fiber 1. This is same as the constitution as shown in FIG. 6(a), in which the optical isolator 62 is connected in the input direction of the combining side port of the optical multi/demodulator 61.

In FIG. 4, by setting so that the polarized light of the Faraday rotator 5 may be rotated 22.5 degrees clockwise, this time, by feeding the lights of wavelength $\lambda_1$, $\lambda_2$ from the input and output fibers 81, 82, the lights of wavelength $\lambda_1$, $\lambda_2$ are combined and coupled with the input and output fiber 1, and the light from the input and output fiber 1 is not coupled with the input and output fibers 81, 82. In this case, it is same as the constitution shown in FIG. 6 (b), in which the optical isolator 62 is connected in the output direction from the combining side port of the optical multi/demodulator 61.

Thus, the embodiment realizes an optical circuit having both function for separating or combining the light and function of optical isolation, and the structure is simple as compared with the combination of individual components, so that the loss may be reduced.

The embodiment relates to a two-wave multiplex optical circuit, but this is not limitative, and the multiplicity can be increased by increasing the number of output fibers in the array direction.

Figure 7:
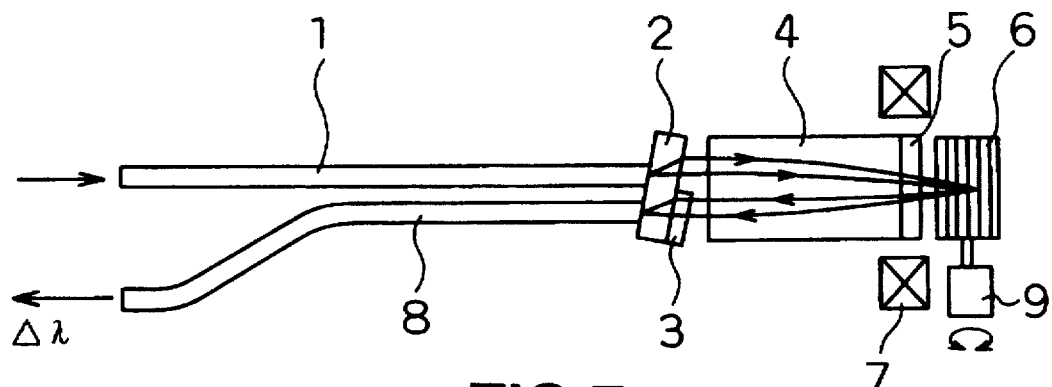
FIG. 7 is a structural diagram of an optical circuit in a third embodiment.

FIG. 7 is a structural diagram of a third embodiment, and what differs from the first embodiment in FIG. 1 is that a rotary mechanism 9 for rotating the diffraction grating 6 is attached to the diffraction grating 6. Its operation is described by referring to FIG. 7 and FIG. 3. The rotary mechanism 9 is designed to rotate the diffraction grating 6 on a rotary shaft parallel to the grating groove direction. As a result, as compared with the first embodiment having the function for selecting the wavelength of only the light of specific wavelength, in this embodiment, the diffraction grating 6 is rotated by the rotary mechanism 9, and by setting at specific rotating angle, the light of desired wavelength out of the light in the wavelength region spreading in the wavelength dispersing direction of the diffraction grating 6 can be coupled with the output fiber position 8a.

In thus constituted embodiment, an optical circuit having both wavelength tunable filter function and optical isolation function is realized.

In the third embodiment, the diffraction grating 6, which is a wavelength dispersion element, is rotated, but instead the input and output unit, that is, the input and output fiber 1 or 8 may be designed to be moved in the wavelength dispersing direction by the diffraction grating 6.

Figure 8:
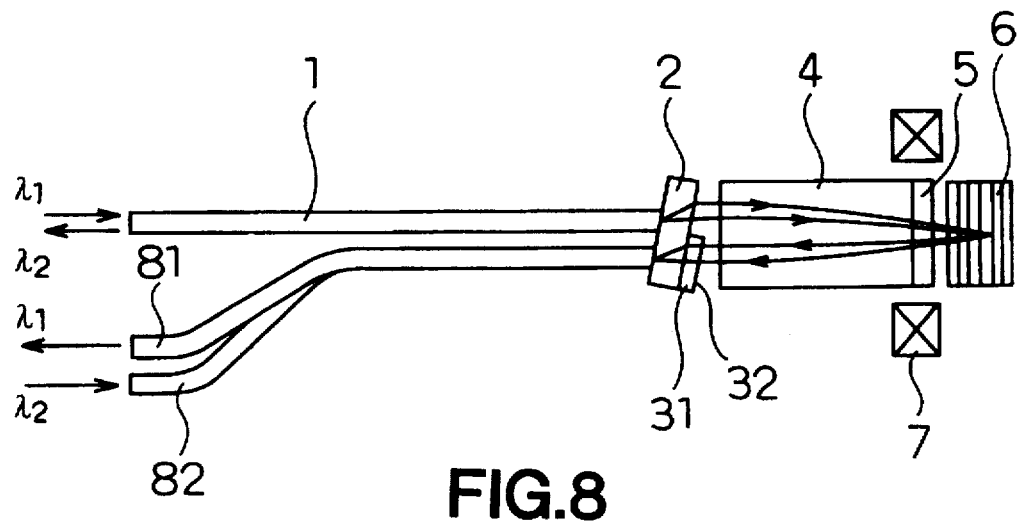
FIG. 8 is a structural diagram of an optical circuit in a fourth embodiment.
Figure 9:
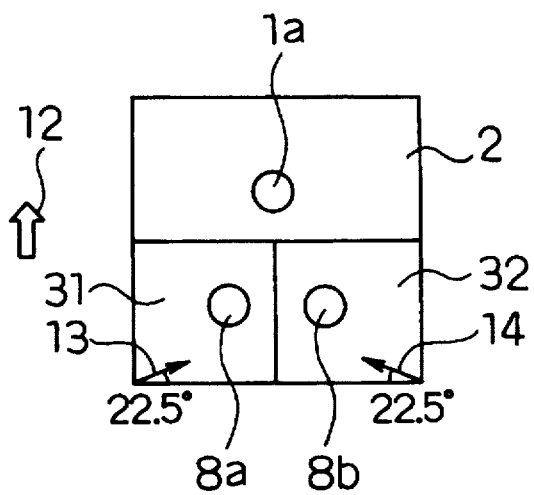
FIG. 9 is a diagram showing the configuration of birefringent crystal and half-wavelength plate in the fourth embodiment.

FIG. 8 is a structural diagram of an optical circuit in a fourth embodiment, and what differs from the second embodiment is that the two half-wavelength plates 31, 32 are disposed by varying the inclination in the opticalaxis direction as shown in FIG. 9. That is, at position 8a of the input and output fiber 81 corresponding to wavelength $\lambda_1$, a half-wavelength plate 31 having the same inclination in the optical axis direction as in the second embodiment is disposed, and at position 8b of the input and output fiber 82 corresponding to wavelength $\lambda_2$, the optical axis direction 14 of a half-wavelength plate 32 is disposed at an inclination of 22.5 degrees in the clockwise direction to the vertical line of the polarized light separating direction 12 on the plane of the half-wavelength plate 32. Therefore, in FIG. 8, the half-wavelength plate 31 and half-wavelength plate 32 are overlapped in the depth direction on the drawing.

The operation of the optical circuit in the fourth embodiment is described by reference to FIG. 10(a) and FIG. 10(b). For the convenience of explanation, herein, the half-wavelength plate 31 and half-wavelength plate 32 are set apart from each other in FIG. 10(a) and FIG. 10(b). The operation about the light of wavelength $\lambda_1$ is same as in the second embodiment, and hence the operation about the light of wavelength $\lambda_2$ is described below.

Figure 10A:
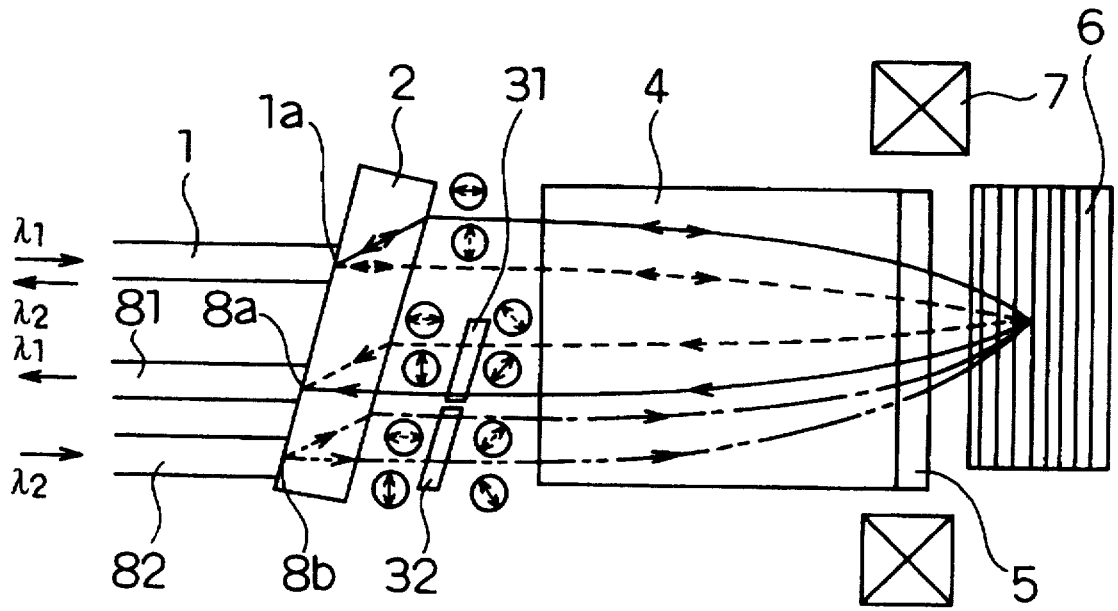
FIG. 10(a) and 10(b) are diagrams showing the modes of light propagation and polarization in the fourth embodiment.

First, in the forward direction in FIG. 10(a), the light of wavelength $\lambda_2$ from the input and output fiber 82 enters the birefringent crystal 2, and is polarized and separated into ordinary light component indicated by double dot chain line and extraordinary light component indicated by single dot chain line, and enters the half-wavelength plate 32. In the half-wavelength plate 32, the polarizing direction of each polarized light component is changed by 45 degrees counterclockwise, and the polarized light is rotated 22.5 degrees counterclockwise by the Faraday rotator 5 through the lens 4. Afterwards, entering the diffraction grating 6, the wavelength is dispersed, and the light is rotated again 22.5 degrees counterclockwise by the Faraday rotator 5. As a result, each polarized light component of the wavelength dispersed light is rotated 90 degrees in the polarizing direction, and the ordinary light component becomes extraordinary light component, and extraordinary light component becomes ordinary light component, and it is propagated in the crystal of the birefringent crystal 2 through the lens 4 so that the polarized lights may be combined, and thereby the light of wavelength $\lambda_2$ is selectively coupled with the input and output fiber 1.

Figure 10B:
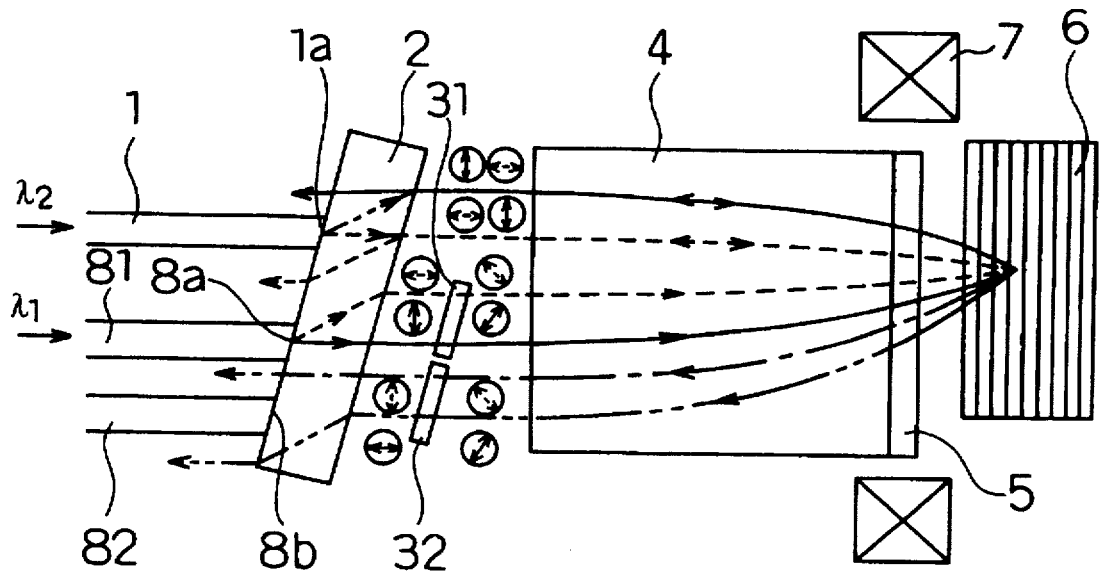
Figure 11B:
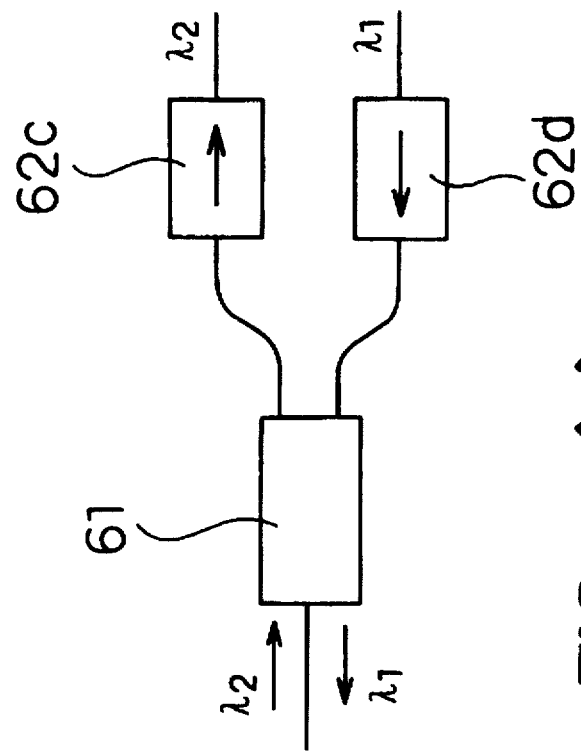
FIG. 11(a) and 11(b) are diagrams for explaining the function of the fourth embodiment.
Figure 11A:
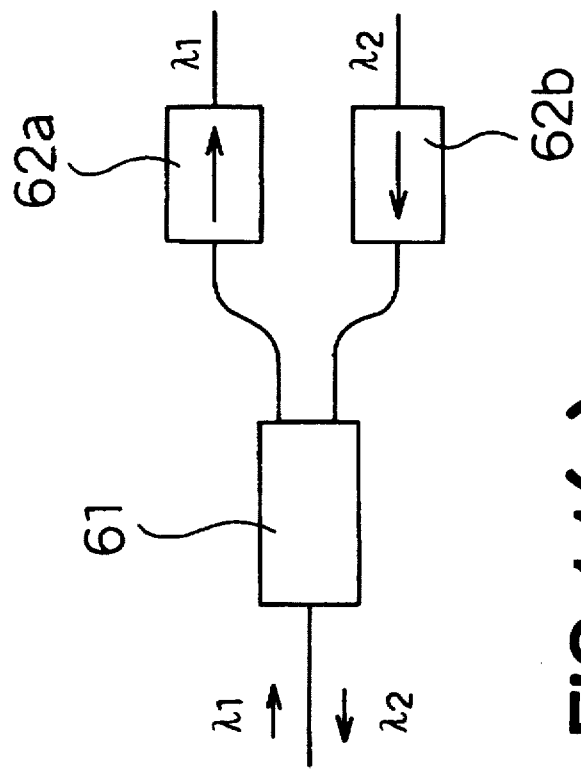

In the reverse direction, as shown in FIG. 10(b), when the light of wavelength $\lambda_2$ is entered from the input fiber 1, it is not coupled with the output fiber 82. That is, as shown in FIG. 11(a), it simultaneously has the same function as in the constitution in which two optical isolators 62a, 62b and optical multi/demodulator 61 are connected so that the light of wavelength $\lambda_1$ may be set in the separating direction, and that the light of wavelength $\lambda_2$ may be set in the combining direction.

In FIG. 8, by setting so that the polarized light of the Faraday rotator 5 may be rotated 22.5 degrees clockwise, this time, the light of wavelength $\lambda_1$ is propagated in the forward direction from the output fiber 81 to the input fiber 1 so as to be coupled, whereas the light of wavelength $\lambda_2$ may be propagated in the forward direction from the input fiber 1 to the output fiber 82 to be coupled, so that the directivity may be completely inverted. This is the same effect as in the constitution with individual components in FIG. 11(b).

In the fourth embodiment, meanwhile, the optical circuit of two wavelengths is shown, but this is not limitative, and the multiplicity may be increased by increasing the number of fibers in the array direction in every different half-wavelength.

Figure 12:
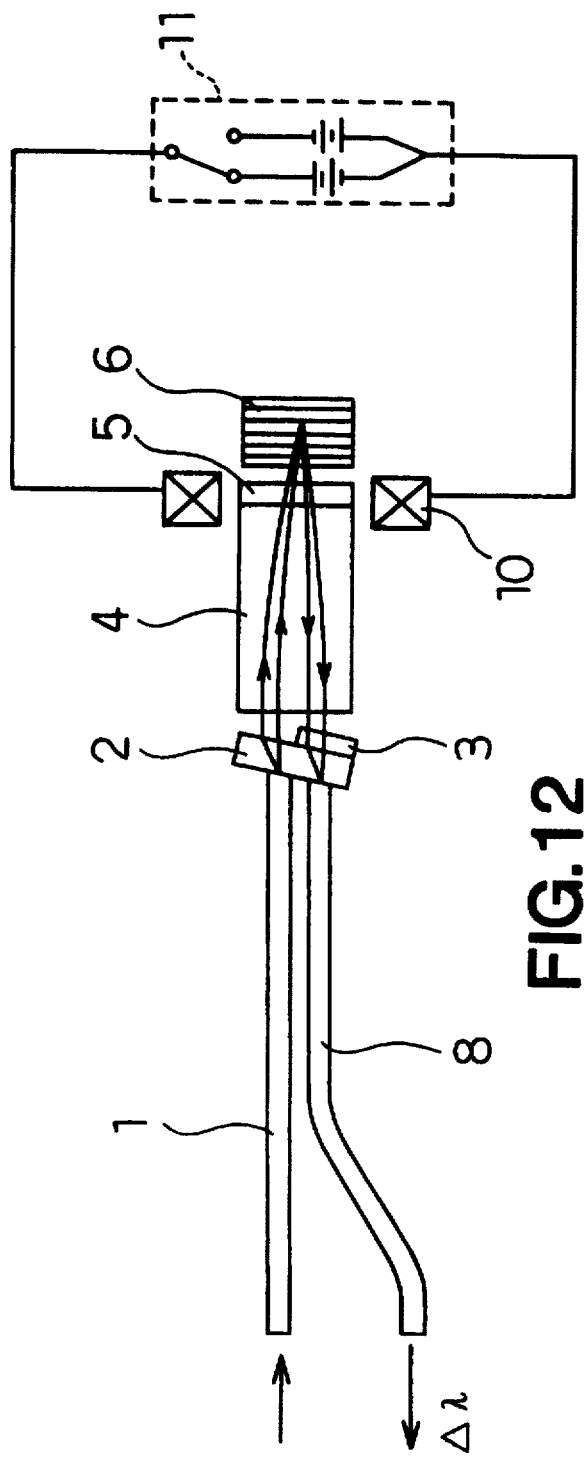
FIG. 12 is a structural diagram of an optical circuit in a fifth embodiment.

FIG. 12 is a structural diagram showing an optical circuit in a fifth embodiment. What this embodiment differs from the first embodiment is that an electromagnet 10 and a voltage application direction changer 11 are provided instead of the magnet 7 in FIG. 1. The electromagnet 10 and voltage application direction changer 11 compose polarity inverting means.

Accordingly, the polarity of the magnetic field generated by the electromagnet 10 can be inverted by the voltage application direction changer 11, and hence the rotating direction of polarized light of the Faraday rotator 5 may be set freely whether clockwise or counterclockwise. Therefore, the directivity of the optical isolation function can be controlled, and the function of connecting the wavelength selection filter 60 and direction varying isolator 63 as shown in FIG. 13(a) may be obtained at the same time.

Figure 14:
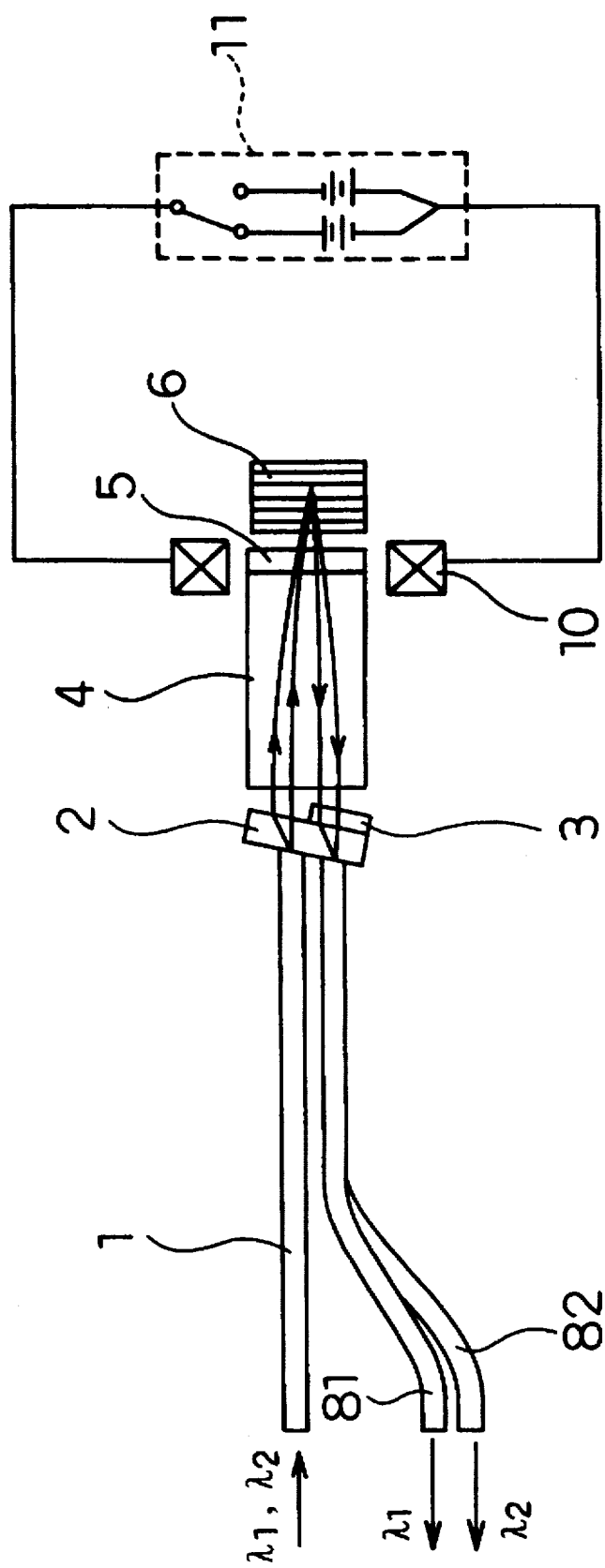
FIG. 14 is a structural diagram of an optical circuit in a sixth embodiment.

FIG. 14 is a structural diagram showing an optical circuit in a sixth embodiment. What this embodiment differs from the second embodiment is that an electromagnet 10 and voltage application direction changer 11 are provided as polarity inverting means, instead of the magnet 7 in FIG. 4.

Figure 13B:
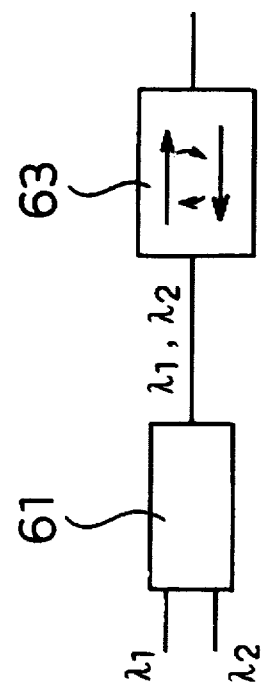
FIG. 13(b) is a structural diagram for explaining the function of a sixth embodiment.
Figure 13A:
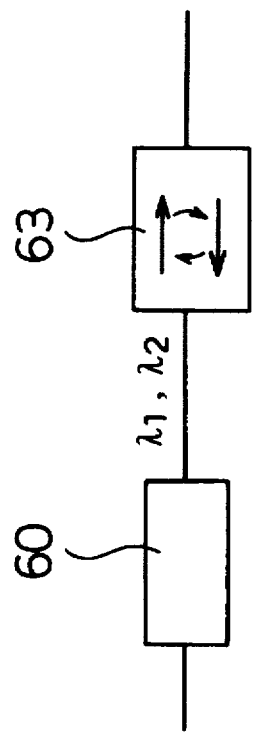
FIG. 13(a) is a structural diagram for explaining the function of the fifth embodiment.

As a result, same as in the fifth embodiment, the directivity of the optical isolation function can be freely controlled, and, as shown in FIG. 13(b), the function of connecting optical multi/demodulator 61 and direction varying isolator 63 may be obtained at the same time.

Figure 15:
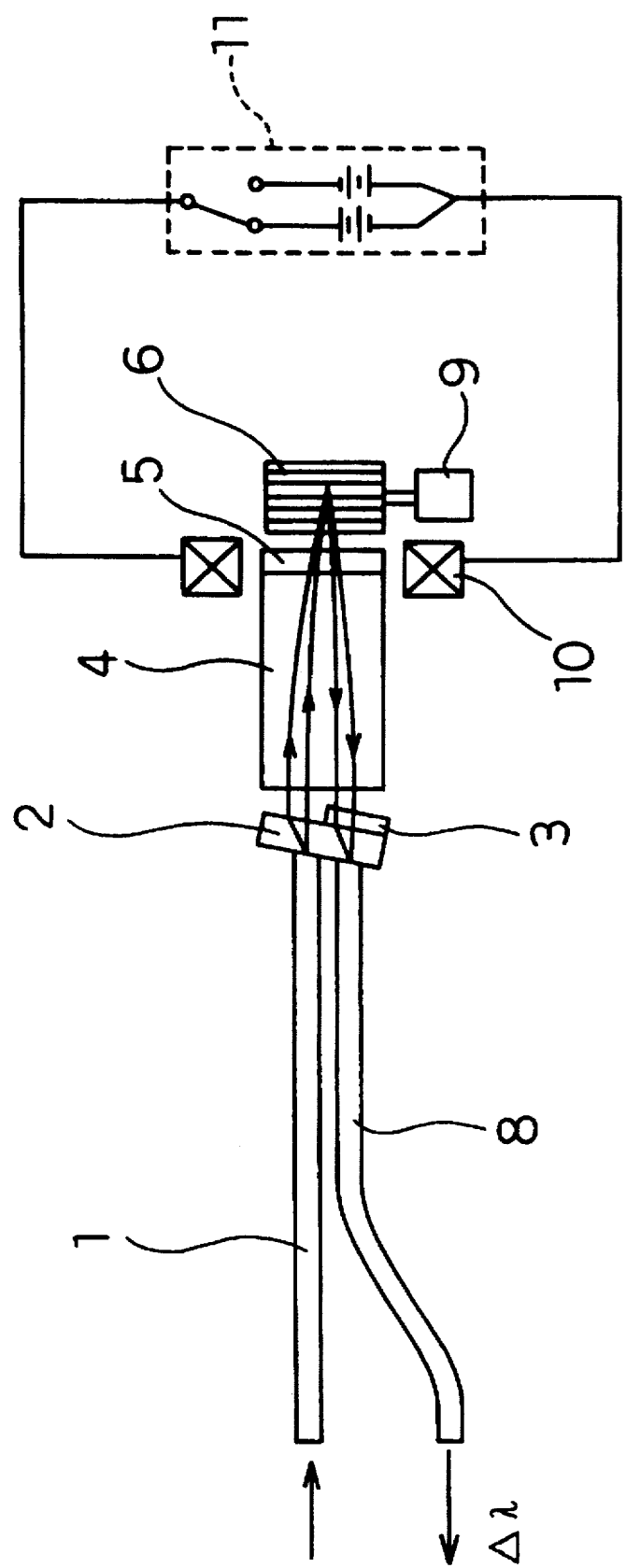
FIG. 15 is a structural diagram of an optical circuit in a seventh embodiment.

FIG. 15 is a structural diagram showing an optical circuit in a seventh embodiment. What this embodiment differs from the third embodiment is that an electromagnet 10 and voltage application direction changer 11 are provided as polarity inverting means, instead of the magnet 7 in FIG. 7.

As a result, same as in the fifth embodiment, the directivity of the optical isolation function can be freely controlled, and the wavelength tunable filter function and direction varying isolator function may be obtained at the same time.

Figure 16:
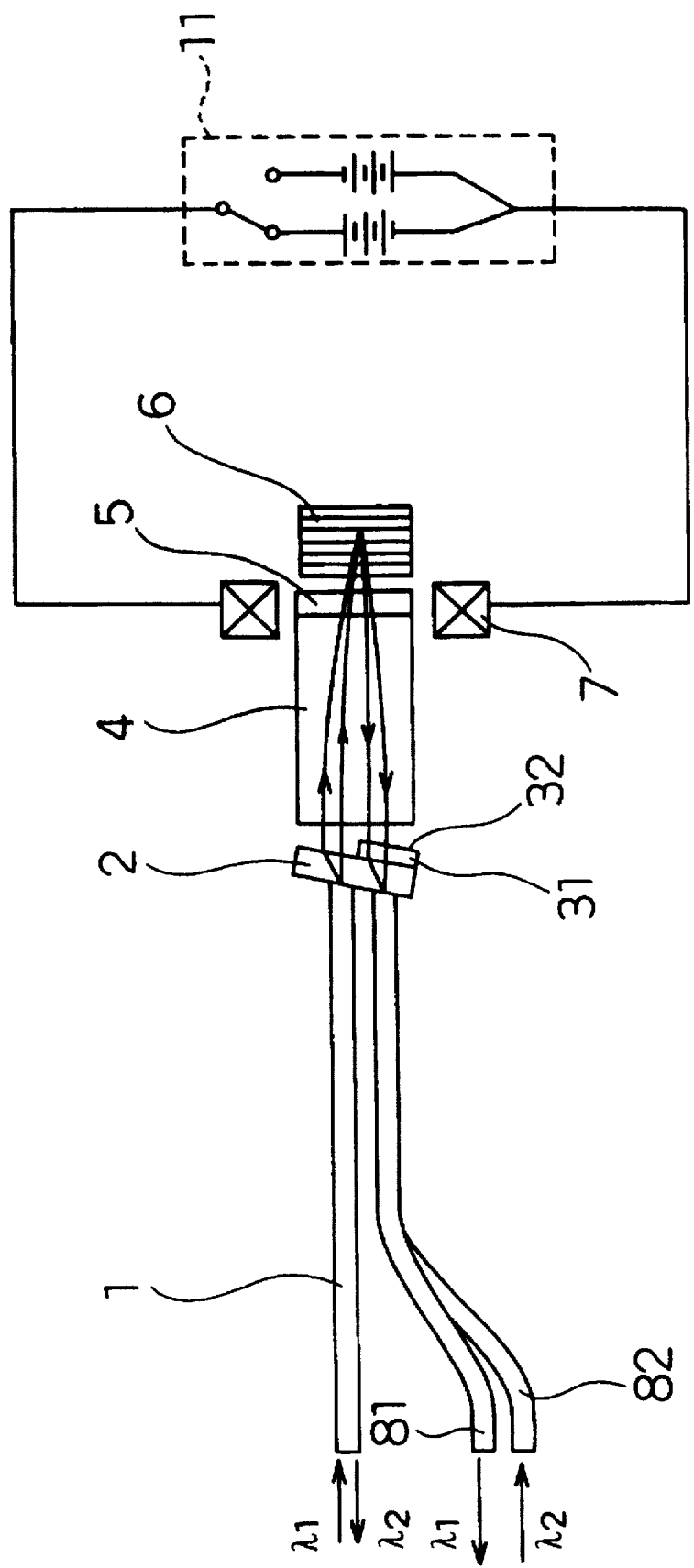
FIG. 16 is a structural diagram of an optical circuit in an eighth embodiment.

FIG. 16 is a structural diagram showing an optical circuit in an eighth embodiment. What this embodiment differs from the fourth embodiment is that an electromagnet 10 and voltage application direction changer 11 are provided as polarity inverting means, instead of the magnet 7 in FIG. 8.

As a result, same as in the sixth embodiment, the directivity of the optical isolation function can be freely controlled, and the optical multi/demodulating function and direction varying isolator function may be obtained at the same time.

Thus, in the fifth to eighth embodiments, considering application into light transmission system or the like, the directivity of the isolator can be set by external control depending on the light propagation direction without varying the constitution of the components, so that a highly versatile constitution is realized.

In the foregoing embodiments, the birefringent crystal may be any anisotropic material differing in the refractive index in the ordinary light component and extraordinary light component, such as rutile crystal, calcite and rock crystal, so that polarization and separation may be effected.

The half-wavelength plate may be rock crystal, sapphire or other material capable of changing the phase of polarization in the optical axis direction by $\pi$ only.

As the Faraday rotator used as an element of optical rotation, a crystal having optical rotation such as garnet crystal, or thin film material by liquid phase growth may be applied. To express the optical rotation, it is necessary to apply a magnetic field, but similar effects are expected by other materials capable of controlling the optical rotation by external factors such as electric field and light.

For disposition of the diffraction grating, the inclination angle may be set near Littrow angle or blaze angle. Especially by using a Fourier diffraction grating of high diffraction efficiency and small polarization dependence (see, for example, M. Iida, K. Hagiwara, and H. Asakura: Holographic Fourier diffraction gratings with a high diffraction efficiency optimized for optical communication systems, Applied Optics, Vol. 30, No. 15, p. 3015, 1992), the diffraction efficiency is over 90% without random polarization, and the polarization dependence is as small as within 5%, so that a constitution of low loss and small polarization noise may be achieved.

Moreover, the rotating direction of Faraday rotator, optical axis inclination of half-wavelength plate, and configuration are not limited to the combination in the foregoing embodiments, and, for example, the half-wavelength plate may be provided at the input fiber position side, the inclination of the optical axis direction and rotating direction of Faraday rotator may be set properly to install, so that coupling in the forward direction of light and shielding of light in the reverse direction may be effected.

Thus, the light from the light input part is selected in wavelength, and is coupled efficiently with the light output part, while the return light component is not coupled with the light input part, and moreover the propagation direction may be varied depending on the wavelength. Still more, the transmitted light may be cut off as desired, and the wavelength region for selecting the wavelength may be also varied.

In the embodiments, by using a diffraction grating having the action for reflecting the light as the wavelength dispersing element, the light input and output are disposed at the same side, but this is not limitative, and it may be constituted so that the light passes from one to other side by using a light transmission type diffraction grating. In this case a Faraday rotator, a lens, and a birefringent crystal are necessary to be symmetrically disposed at a center of the diffraction grating, and a half-wavelength plate is necessary to be disposed at an either side of an optical circuit.

In the foregoing embodiments, a single lens is used as the lens, but the lens composition is not particularly limited as far as the specified functions are provided.

Embodiments of light transmission systems using the optical circuits of the invention are described below by referring to the drawings.

Figure 17:
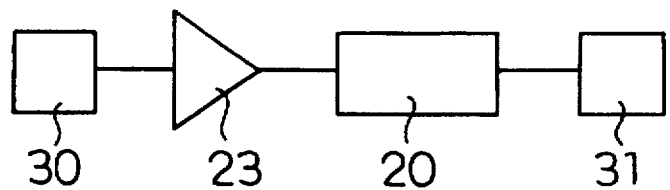
FIG. 17 is a structural diagram of a light transmission system in a ninth embodiment.

FIG. 17 is a structural diagram of a light transmission system in a ninth embodiment. In FIG. 17, reference numeral 30 is a light transmitter, 23 is a optical amplifier, 20 is the optical circuit in the first embodiment of the invention (see FIG. 1), and 31 is a light receiver. The light from the light transmitter 30 is amplified by the optical amplifier 23, and is fed into the optical circuit 20. The optical circuit 20 efficiently passes the light in the wavelength region of signal light component of the light transmitter 30, while cutting off the light in other wavelength region, and the ASE light component generated in the optical amplifier 23 is removed, and low noise signal light is led into the light receiver 31. If the return light enters the optical circuit 20 through the light receiver 31, since it also has the optical isolation function, the return light does not enter the optical amplifier 23, so that the optical signal will not deteriorate.

In the ninth embodiment, the optical circuit in FIG. 1 is used, but this is not limitative, and the optical circuit in FIG. 7, FIG. 12 or FIG. 15 may be used in the constitution.

Figure 18:
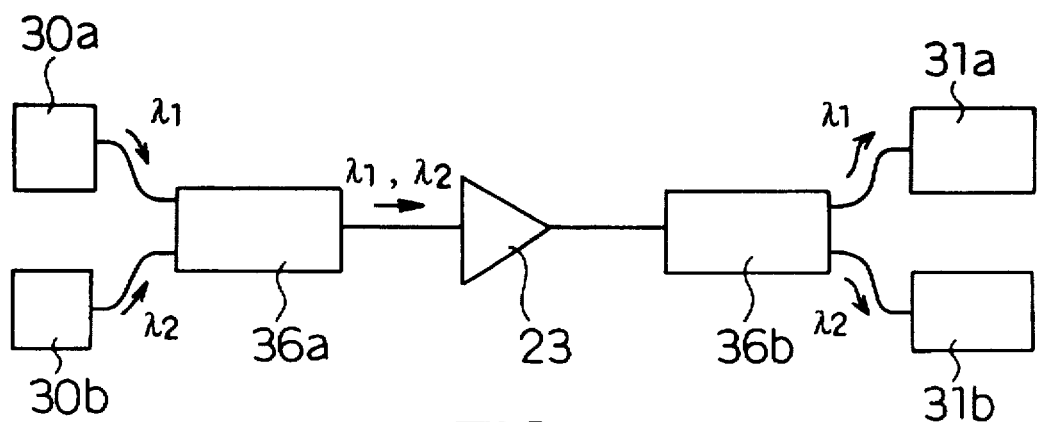
FIG. 18 is a structural diagram of a light transmission system in a tenth embodiment.

FIG. 18 is a structural diagram of a light transmission system in a tenth embodiment of the invention. In FIG. 18, reference numerals 30a, 30b are light transmitters of wavelength $\lambda_1$, $\lambda_2$, are light receivers of wavelength $\lambda_1$, $\lambda_2$, and 36a, 36b are optical circuits in the second embodiment (see FIG. 4). Usually, the light transmitters 30a, 30b and optical circuit 36a are disposed at the transmission end side, whereas the optical circuit 36b and light receivers 31a, 31b are disposed at the reception end side. The optical circuit 36a is designed, for example, so that the polarized light may be rotated counterclockwise by the Faraday rotator 6 in FIG. 4, and the optical circuit 36b inverts the polarity of the magnet 7, and the polarized light is rotated clockwise by the Faraday rotator 6.

In operation, the light of wavelength $\lambda_1$ from the light transmitter 30a, and the light of wavelength $\lambda_2$ from the light transmitter 30b are combined in the optical circuit 36a, and the wavelength multiplex light is amplified in batch by the optical amplifier 23, and then branched off by the optical circuit 36b, so that lights of individual wavelengths are received by the light receivers 31a, 31b.

By thus constituting, ASE light component of the optical amplifier 23 is removed by the optical multi/demodulating function of the optical circuit to obtain a low noise signal light, and moreover since the optical isolation function is incorporated, if return light is generated in the transmission path, it is suppressed in the optical circuit 36a, or the return light which may be generated in the light receivers 31a, 31b is suppressed in the optical circuit 36b. Or, as the optical circuit, by using the optical circuit in the sixth embodiment (see FIG. 14), the voltage application direction can be changed, and the rotation of polarized light by the Faraday rotator 5 may be set either clockwise or counterclockwise, and it may be applied in the individual optical circuits 36a, 36b.

Figure 19:
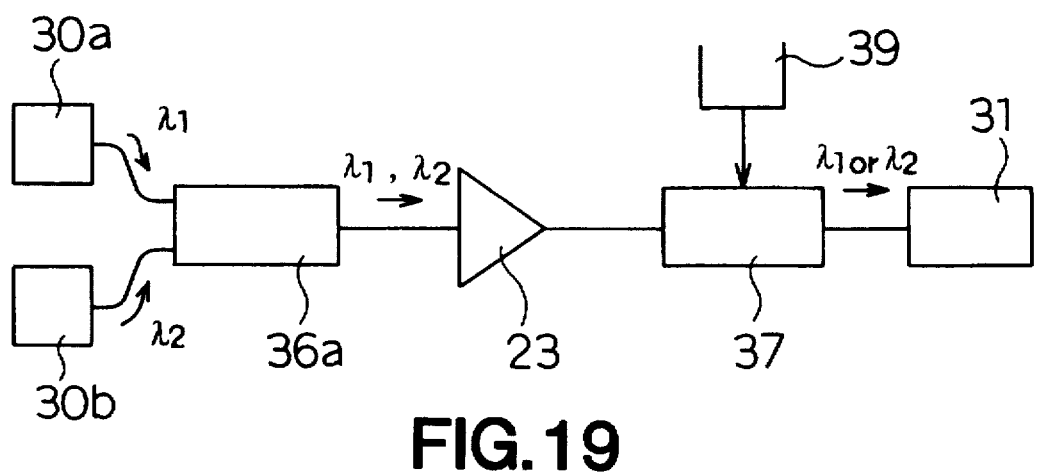
FIG. 19 is a structural diagram of a light transmission system in an eleventh embodiment.

FIG. 19 is a structural diagram of a light transmission system in an eleventh embodiment. In FIG. 19, reference numeral 36a is the optical circuit in the second embodiment, and 37 is the optical circuit in the third embodiment (see FIG. 7), and a controller 39 for controlling the rotary mechanism 9 of the diffraction grating 6 is connected to this optical circuit 37. Usually, the optical circuit 37 and controller 39 are disposed at the light reception end side.

In operation, the light of wavelength $\lambda_1$ of the light transmitter 30a, and the light of wavelengths, $\lambda_2$ from the light transmitter 30b are combined in the optical circuit 36a, and the wavelength multiplexed light is amplified in batch by the optical amplifier 23, and is fed into the optical circuit 37. In the optical circuit 37, according to the command from the controller 39, one wavelength of wavelengths $\lambda_1$ and $\lambda_2$ is selected, and the light is received by the light receiver 31.

In such constitution, the light of desired wavelength can be selected by the wavelength variable filter function of the optical circuit 37, and the ASE light component of the optical amplifier 23 is removed to produce low noise signal light, and owing to the incorporated optical isolation function, if return light is regenerated in the transmission path, it is suppressed in the optical circuit 36a, or the return light that may be generated in the light receiver 31 is suppressed in the optical circuit 37.

Figure 20:
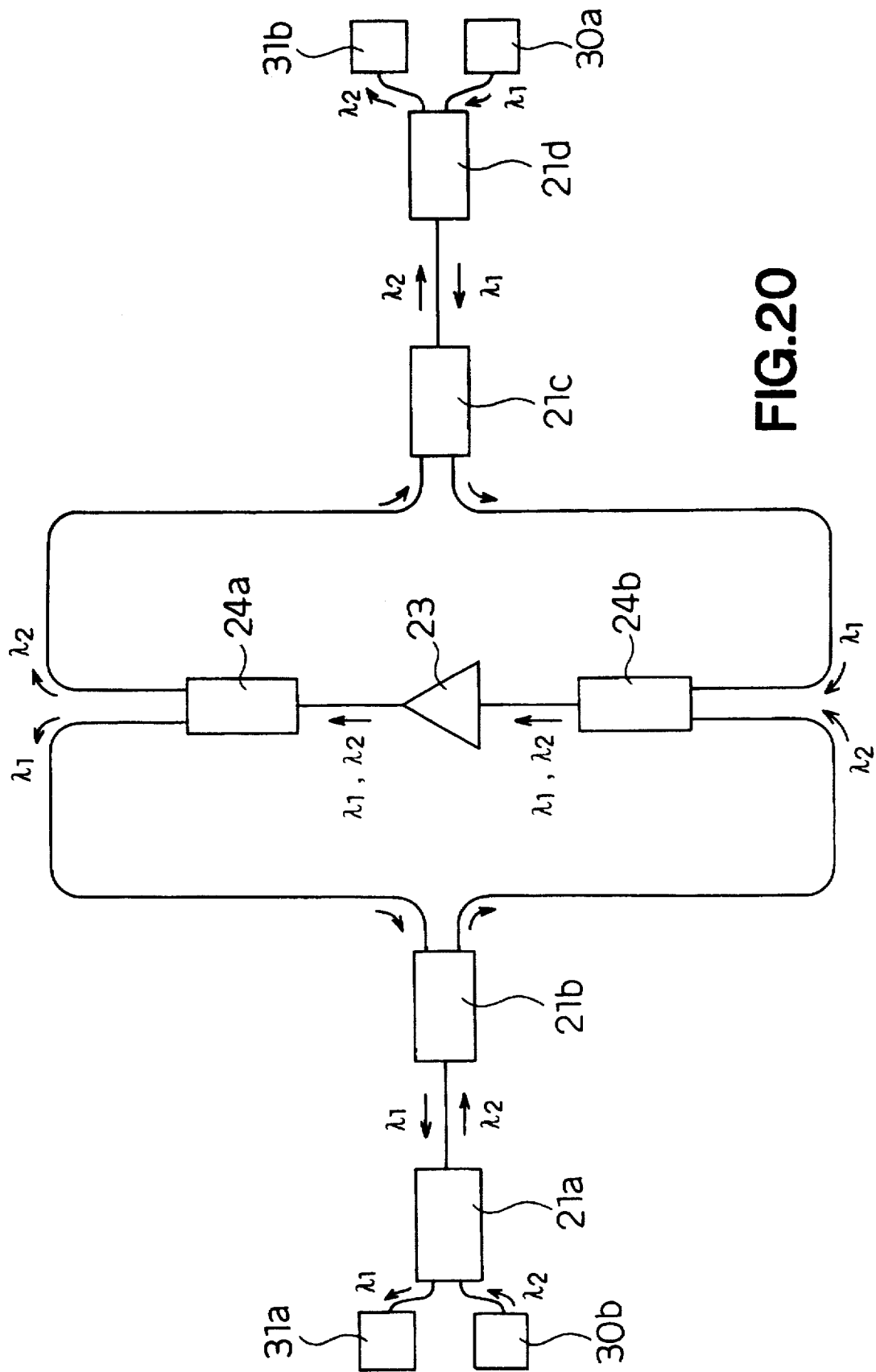
FIG. 20 is a structural diagram of a light transmission system in a twelfth embodiment.

FIG. 20 is a structural diagram of a light transmission system in a twelfth embodiment. In FIG. 20, reference numerals 30a, 30b are light transmitters of wavelength $\lambda_1$, $\lambda_2$, 31a, 31b are light receivers of wavelength $\lambda_1$, $\lambda_2$, 21a, 21b, 21c, 21d are optical multi/demodulators, and 24a, 24b are optical circuits in the second embodiment. The optical circuit 24a corresponds to, for example in FIG. 4, counterclockwise rotation of the polarized light by the Faraday rotator 5, and the optical circuit 24b, to clockwise rotation of polarized light by the Faraday rotator 5 by inverting the polarity of the magnet 7. Usually, the optical amplification unit composed of the optical multi/demodulators 21b, 21c, optical circuits 24a, 24b, and optical amplifier 23 is disposed in the transmission path, while the optical multi/demodulator 21a and optical multi/demodulator 21b are disposed respectively at the light transmission and reception end sides.

Figure 21:
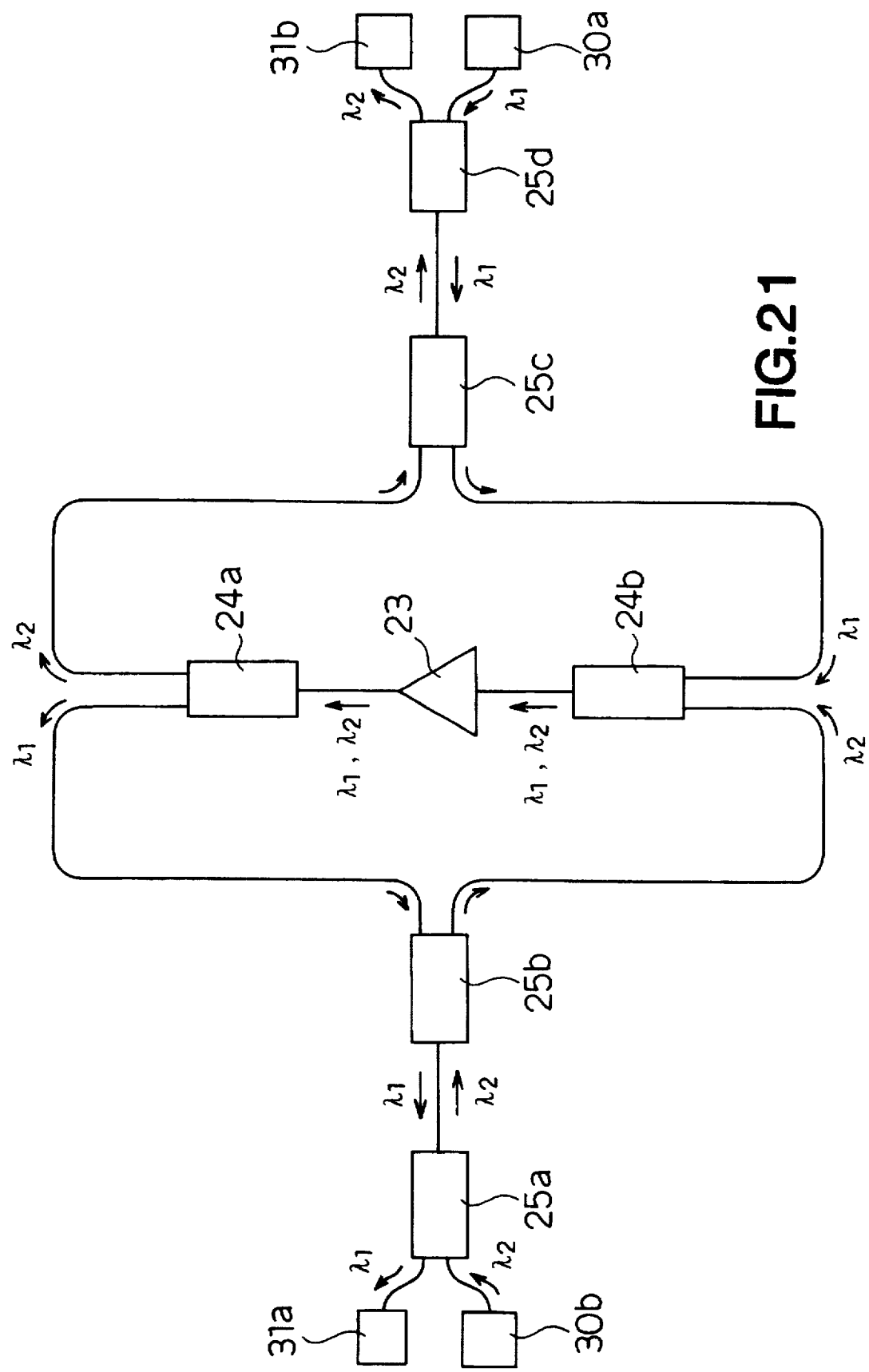
FIG. 21 is a structural diagram of a light transmission system in a thirteenth embodiment.

In operation, first the light of wavelength $\lambda_1$ is led into the optical circuit 24b from the light transmitter 30a through the optical multi/demodulator 21d and optical multi/demodulator 21c. On the other hand, the light of wavelength $\lambda_2$ is led into the optical circuit 24b from the light transmitter 30b through the optical multi/demodulator 21a and optical multi/demodulator 21b, and is combined with the wavelength $\lambda_1$. The light thus multiplexed in wavelength is amplified in batch by the optical amplifier 23, and is separated into wavelengths $\lambda_1$ and $\lambda_2$ by the optical circuit 24a. The separated light of wavelength $\lambda_1$ is led into the light receiver 31a through the optical multi/demodulator 21b and optical multi/demodulator 21a. On the other hand, the light of wavelength $\lambda_2$ is led into the light receiver 31b through the optical multi/demodulator 21c and optical multi/demodulator 21d. In such operation, by using the optical circuit having optical isolation function, the system configuration is simplified, and amplified transmission is realized in two ways at wavelengths $\lambda_1$ and Moreover, as in FIG. 21 which shows a thirteenth embodiment, when the optical multi/demodulators 21a, 21b, 21c, 21d are replaced by the optical circuits 25a, 25b, 25c, 25d in the fourth embodiment (see FIG. 8), there is a function for defining the propagation direction in every wavelength, and it has the same effect as if optical isolators were connected in multiple stages.

Figure 22:
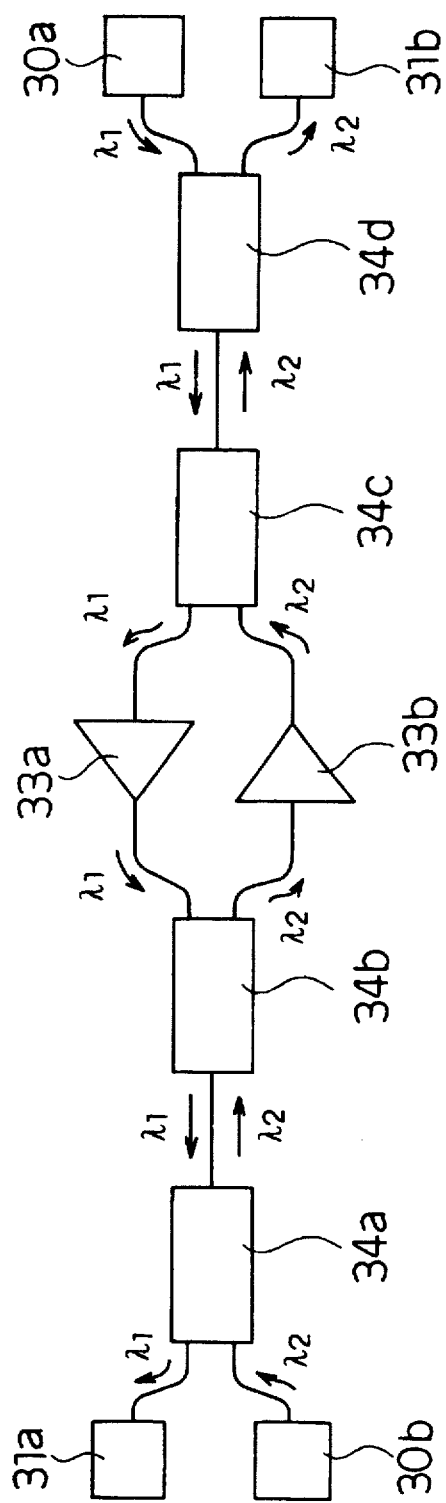
FIG. 22 is a structural diagram of a light transmission system in a fourteenth embodiment.
Figure 23:
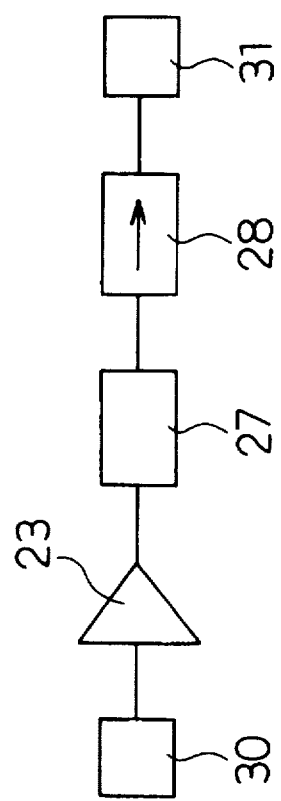
FIG. 23 is a structural diagram of a conventional light transmission system.
Figure 24:
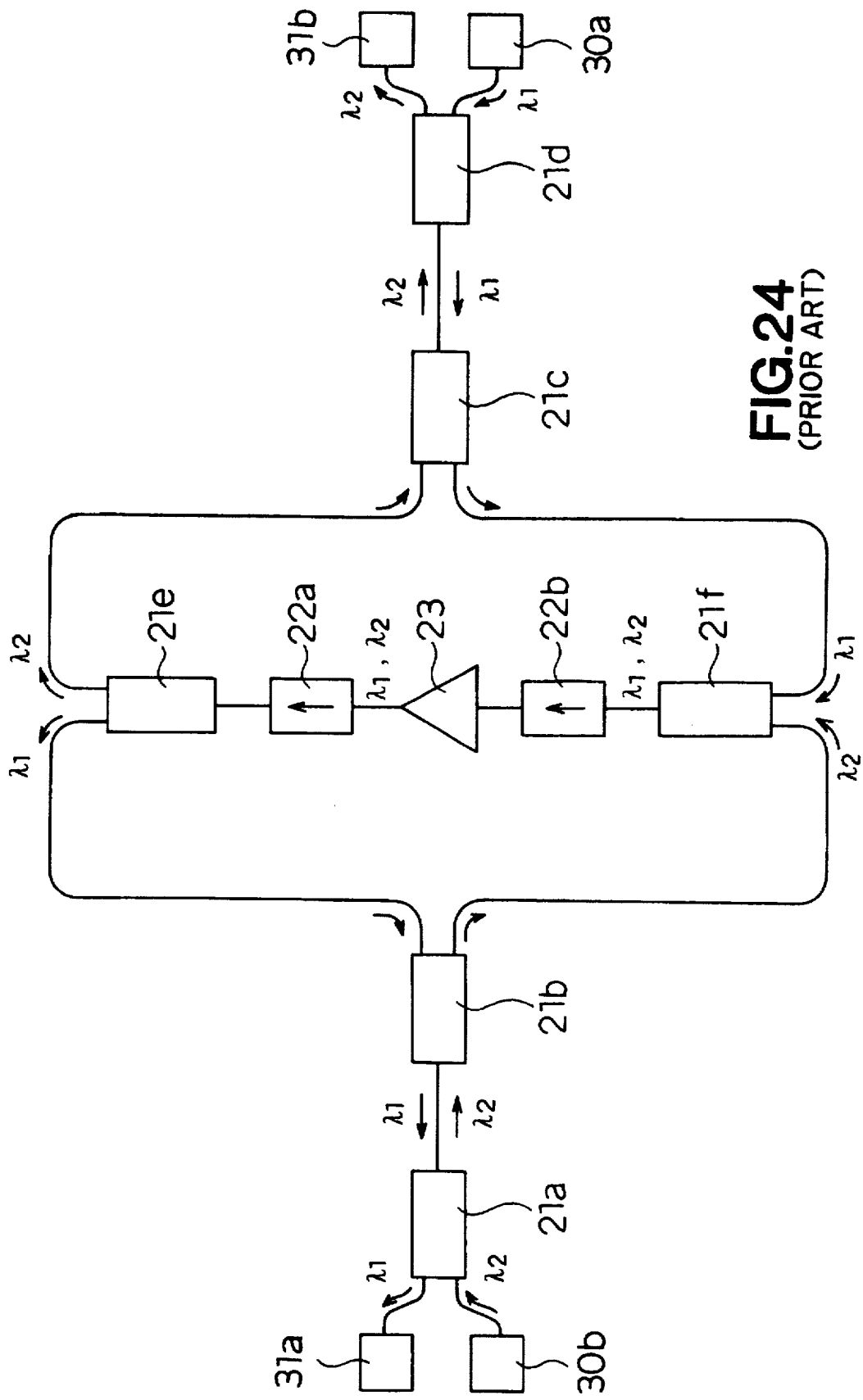
FIG. 24 is a structural diagram of a conventional light transmission system.
Figure 25:
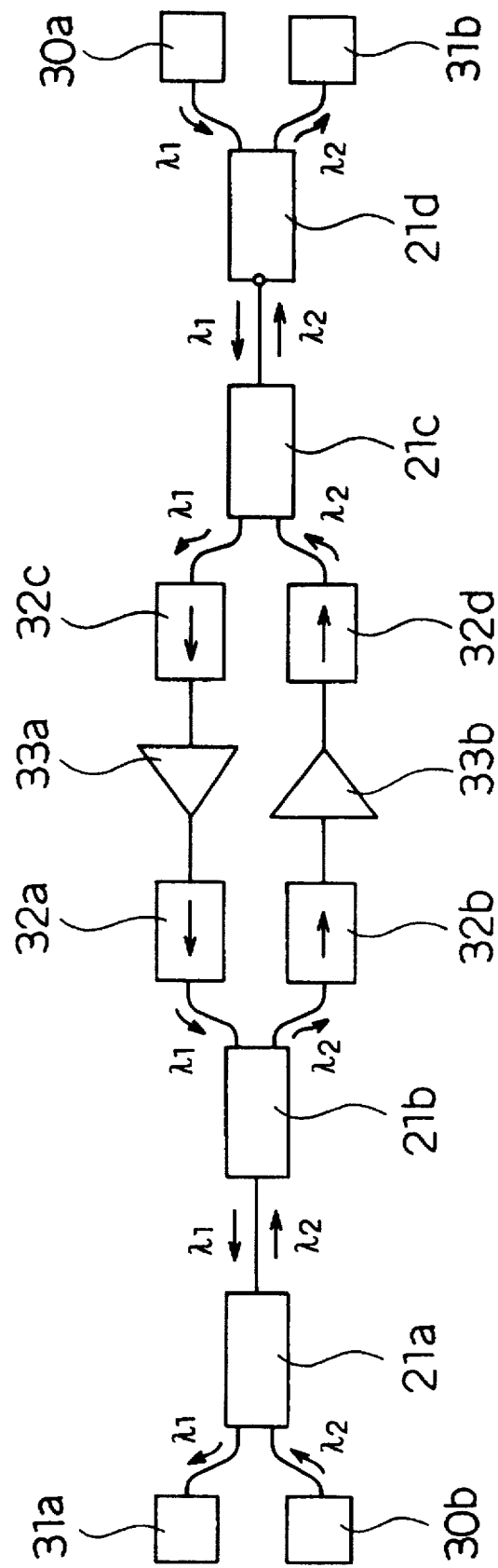
FIG. 25 is a structural diagram of a conventional light transmission system.

FIG. 22 is a structural diagram showing a light transmission system of a fourteenth embodiment. In FIG. 22, reference numerals 34a, 34b, 34c, 34d are optical circuits in the fourth embodiment, and 33a and 33b are optical amplifiers. The optical circuits 34a, 34c, and optical circuits 34b, 34d differ in the propagation direction in every wavelength. Usually, the optical amplification unit composed of optical circuits 34b, 34c and optical amplifiers 33a33b are disposed in the transmission path, while the optical circuit 34a and optical circuit 34d are disposed at the light transmission and reception end sides, respectively.

In operation, the light of wavelength $\lambda_1$ from the light transmitter 30a is combined in the optical circuit 34d and transmitted, and separated in wavelength by the optical circuit 34c inserted in the transmission path, and is amplified in the optical amplifier 33aand is combined again in the optical circuit 34b and transmitted, and is separated in wavelength by the optical circuit 34a and is fed into the light receiver 31a. On the other hand, the light of wavelength $\lambda_2$ from the light transmitter 30b is combined in the optical circuit 34a and transmitted, separated in wavelength by the optical circuit 34b, amplified by the optical amplifier 33b, combined in the optical circuit 34c and transmitted, separated in wavelength by the optical circuit 34d, and is fed into the light receiver 31b.

In such constitution, a two-way wavelength multiplex transmission system simplified in system configuration for disposing amplifiers in every wavelength is built up.

Thus, in such simple constitution, a device simultaneously having wavelength selection function and optical isolation function, having multiple wavelengths, and capable of controlling the direction of isolation can be built up. Using optical amplifiers composed of such optical circuits, a system suited to transmission of large capacity and multiple distribution such as wavelength multiplex and two-way communication can be built up with a reduced number of constituent parts.

In the foregoing embodiments, one or two optical amplifiers were used, but, instead, a plurality of optical amplifiers may be connected in multiple stages. Moreover, when using optical amplifiers as repeaters, optical amplification units comprising optical circuits may be connected in multiple stages.

In addition, an embodiment capable of controlling optical rotation may be applied also in the optical circuit in the light transmission system configuration in an embodiment. In the tenth to fourteenth embodiments, meanwhile, two wavelengths are used, but it is also possible to build up wavelength multiple transmission of three or more waves.

As clear from the description herein, it is the feature of the invention that the number parts for composing an optical circuit and a light transmission system using the same can be decreased, so that the constitution and assembly may be simplified.

While the invention has been described with reference to exemplary embodiments, it is not limited thereto. Rather, the appended claims should be construed to include other variants and embodiments of the invention which may be made by those skilled in the art without departing from the true spirit and scope of the present invention.

What is claimed is:

1. An optical circuit comprising:

a plurality of light input and output units for at least one of receiving and emitting light, a polarized light separating and combining element for separating an incident light from at least one light input and output unit of the plurality of light input and output units into two separated polarized lights, and for combining the two separated polarized lights into a combined light to be emitted into at least another of the plurality of light input and output units, polarized light rotating means for rotating the two separated polarized lights at a plurality of specific different angles, and a wavelength dispersing element for dispersing polarized light of a specific wavelength, wherein each one of the plurality of specific angles rotated by the polarized light rotating means is such an angle as to emit the incident light incoming from the one light input and output unit to the other light input and output unit, and to prevent an emission of further light incoming from the other light input and output unit to the one light input and output unit.

2. The optical circuit of claim 1, wherein the polarized light rotating means comprises:

a first polarized light rotating part for rotating the two separated polarized lights at a plurality of specific different angles to a light running direction, and a second polarized light rotating part composed of a phase element provided at a light passing position of at least one of the one and the other light input and output units, for rotating the two separated polarized lights in the same direction as the light running direction.

3. The optical circuit of claim 2, wherein the phase element is a half-wavelength plate.

4. The optical circuit of claim 1, wherein the polarized light rotating means has a plurality of phase elements differing in the angle of rotation, disposed at a plurality of light passing positions in at least every two light input and output units of the plurality of light input and output units.

5. The optical circuit of claim 4, wherein each one of the plurality of phase elements is a half-wavelength plate.

6. The optical circuit of claim 1, wherein the polarized light rotating means has an optical rotor capable of changing the angle of rotation of polarized light.

7. The optical circuit of claim 6, wherein the optical rotor is a Faraday rotator element, and further comprising polarity inverting means for inverting the polarity of a magnetic field to be applied to the Faraday rotator element.

8. The optical circuit of claim 1, wherein at least one of the one and the other light input and output units and the wavelength dispersing element possesses one of a moving and rotating mechanism.

9. The optical circuit of claim 1, wherein the wavelength dispersing element is a diffraction grating.

10. The optical circuit of claim 1, wherein the wavelength dispersing element has an action for reflecting light.

11. The optical circuit of claim 1, wherein a lens is disposed at an opposite side of the one light input an output unit with respect to the polarized light separating and combining element.

12. The optical circuit of claim 1, wherein a polarized light separating direction of the polarized light separating and combining element and a wavelength dispersing direction of the wavelength dispersing element are not parallel to each other.

13. The optical circuit of claim 1, wherein the polarized light separating and combining element is a birefringent crystal.

14. A light transmission system comprising a light transmitter for sending out light, at least one optical amplifier for amplifying the sent light, an optical circuit for passing the amplified light, said optical circuit comprising:

(a) a plurality of light input and output units for at least one of receiving and emitting light, (b) a polarized light separating and combining element for separating an incident light from at least one light input and output unit of the plurality of light input and output units into two separated polarized lights, and for combining the two separated polarized lights into a combined light to be emitted into at least another of the plurality of light input and output units, (c) polarized light rotating means for rotating the two separated polarized lights at a plurality of specific different angles, and (d) a wavelength dispersing element for dispersing polarized light of a specific wavelength, wherein each one of the plurality of specific angles rotated by the polarized light rotating means is such an angle as to emit the incident light incoming from the one light input and output unit to the other light input and output unit, and to prevent an emission of further light incoming from the other light input and output unit to the one light input and output unit, and a light receiver for receiving the combined light passed by said optical circuit.

15. The light transmission system of claim 14, wherein the light transmitter transmits by multiplexing two or more lights differing mutually in wavelength.

16. The light transmission system of claim 14, wherein the light receiver separately receives a plurality of individual lights, each one of said plurality of individual lights mutually differing in wavelength, passed by said optical circuit.

17. A light transmission system comprising:

a plurality of light transmitting and receiving units for transmitting and receiving light, an optical circuit group possessing a plurality of optical circuits for passing the light transmitted between the plurality of light transmitting and receiving units, each one of said plurality of optical circuits comprising:

(a) a plurality of light input and output units for at least one of receiving and emitting light, (b) a polarized light separating and combining element for separating an incident light from at least one light input and output unit of the plurality of light input and output units into two separated polarized lights, and for combining the two separated polarized lights into a combined light to be emitted into at least another of the plurality of light input and output units, (c) polarized light rotating means for rotating the two separated polarized lights at a plurality of specific different angles, and (d) a wavelength dispersing element for dispersing polarized light of a specific wavelength, wherein each one of the plurality of specific angles rotated by the polarized light rotating means is such an angle as to emit the incident light incoming from the one light input and output unit to the other light input and output unit, and to prevent an emission of further light incoming from the other light input and output unit to the one light input and output unit, and at least one optical amplifier for amplifying the combined light passed by the optical circuit group.

18. The light transmission system of claim 17, wherein the plurality of light transmitting and receiving units possess a plurality of light transmitters and a plurality of light receivers mutually differing in wavelength.

19. A method of transmitting light comprising the steps of:

(a) separating an incident light from at least a first light input and output unit into two separated polarized lights;

(b) rotating the two separated polarized lights at a plurality of specific different angles;

(c) dispersing the two separated polarized lights of a specific wavelength;

(d) rotating the two separate polarized lights at a further plurality of specific different angles; and (e) combining the two separated polarized lights into a combined light to be emitted into at least a second light input and output unit, wherein each one of the plurality of specific angles and the further plurality of specific angles that is rotated is such an angle as to emit the incident light incoming from the first light input and output unit to the second light input and output unit, and to prevent an emission of further light incoming from the second light input and output unit to the first light input and output unit.

20. An optical circuit comprising:

a polarized light separating and combining element for receiving an incident light and for separating the incident light into two polarized lights by deflecting the incident light, a first polarized light rotating means for rotating the two polarized lights at a first plurality of specific different angles, a wavelength dispersing element for wavelength-dispersing each of the two polarized lights rotated by said first polarized light rotating means, a second polarized light rotating means for rotating the two polarized lights wavelength-dispersed by said wavelength dispersing element at a second plurality of specific different angles, said second plurality of specific different angles being different from said first plurality of specific different angles, wherein said polarized light separating and combining element receives the two polarized lights rotated by said second polarized light rotating means, and combines the received two polarized lights into a combined light, and each one of the first and second plurality of specific different angles is such an angle as to permit the combining of the two polarized lights received by said polarized light separating and combining element into the combined light, and to prevent said polarized light separating and combining element from combining two further polarized lights into a further combined light, said two further polarized lights being passed through said second polarized light rotating means, said wavelength dispersing element and said first polarized light rotating means, respectively.

* * * * *

UNITED STATES PATENT AND TRADE MARK OFFICE
CERTIFICATE OF CORRECTION

PATENT NO.   : 5,546,219
DATED        : August 13, 1996
INVENTOR(S)  : Masanori Iida It is certified that error appears in the above-identified patent and that said Letters Patent is hereby corrected as shown below:

Column 13, claim 11, line 48, before "output" delete "an" and insert --and--.

Signed and Sealed this

Fourth Day of March, 1997

*Attest:*

BRUCE LEHMAN

*Attesting Officer*    *Commissioner of Patents and Trademarks*